United States Patent [19]

Diderich et al.

[11] Patent Number: 4,968,367
[45] Date of Patent: Nov. 6, 1990

[54] PROCESS FOR PRODUCING FORMED ARTICLE OF TUBULAR ELEMENTS

[75] Inventors: Johannes P. L. M. Diderich, Hilversum; Albert G. G. H. Mey, Groningen, both of Netherlands

[73] Assignee: Stamicarbon B.V., Geleen, Netherlands

[21] Appl. No.: 239,989

[22] Filed: Sep. 2, 1988

[30] Foreign Application Priority Data

Sep. 8, 1987 [NL] Netherlands .......................... 8702120
Sep. 8, 1987 [NL] Netherlands .......................... 8702121

[51] Int. Cl.$^5$ ............................................ B29C 65/00
[52] U.S. Cl. ..................................... 156/182; 156/296; 428/118
[58] Field of Search .................. 156/256, 296, 182; 52/808; 410/154; 428/72, 73, 116, 118, 593; 449/44, 45, 17, 42, 43; 493/966

[56] References Cited

U.S. PATENT DOCUMENTS

| | | | |
|---|---|---|---|
| 2,070,198 | 12/1962 | Haskell | 428/118 |
| 2,793,294 | 5/1957 | Thompson | 74/25 |
| 2,793,718 | 5/1957 | Pajak | 428/118 |
| 3,072,225 | 1/1963 | Cremer | 428/116 |
| 3,825,460 | 7/1974 | Yoshikawa et al. | 156/296 |
| 4,247,583 | 1/1981 | Roy | 428/116 |
| 4,453,367 | 6/1984 | Geyer et al. | 428/116 |
| 4,467,728 | 8/1984 | Horne | 156/305 |
| 4,532,171 | 7/1985 | Balkwill | 156/296 |
| 4,606,960 | 8/1986 | Angel et al. | 428/118 |

FOREIGN PATENT DOCUMENTS

| | | | |
|---|---|---|---|
| 0120056 | 6/1945 | Australia | 428/118 |
| 0680648 | 2/1964 | Canada | 156/294 |
| 438704 | 12/1967 | Switzerland . | |
| 805283 | 3/1958 | United Kingdom . | |
| 794217 | 4/1958 | United Kingdom . | |

OTHER PUBLICATIONS

Machine Desing, Engineering New, vol. 30, No. 22, Oct. 30, 1958, "Dense-Core Load Paths Raise Honeycomb Panel Strength", pp. 14, 15.

Primary Examiner—Michael W. Ball
Assistant Examiner—Steven D. Maki
Attorney, Agent, or Firm—Cushman, Darby & Cushman

[57] ABSTRACT

The invention relates to a process for producing a formed article substantially consisting of tubular elements by placing these elements close together and connecting them with each other and is characterized in that elements having, between them, different properties are placed together. The chosen property may be, for instance, length, thickness, or type of material. The invention also relates to the formed article obtained.

8 Claims, 2 Drawing Sheets

PROCESS FOR PRODUCING FORMED ARTICLE OF TUBULAR ELEMENTS

The invention relates to a process for producing a formed article substantially consisting of tubular elements by placing these elements close together and connecting them with each other, and to a formed article that can be obtained according to this process.

A formed article substantially consisting of tubular elements, also called a honeycomb, is described in, for instance, U.S. Pat. No. 4,606,960. In U.S. Pat. No. 4,606,960 a process is described comprising the positioning of tubes of circular cross-section in a hexagonal stack, upon which the tubes are heated to beyond the softening temperature and are so pressed against each other under high pressure or under vacuum that a honeycomb structure is obtained.

The process to come to such a formed article is rather laborious.

Further, according to the process of U.S. Pat. No. 4,606,960, only flat panels are produced.

Many honeycomb structures are applied in the form of double-curved parts like wing parts of aircraft. The current process of producing these parts is 'machining', so milling out or cutting out the desired shape from a big block, so that about 50% of the original weight is waste, which leads to a definite problem.

Honeycomb structures in curved, but also in flat articles must often be strengthened at specific places in order to be able, for instance, to receive screws. Currently fillers are used for this purpose, which are applied after making the honeycomb, but before making the sandwich structure. This involves an extra processing step.

For the above-mentioned disadvantages the invention provides a solution.

This is achieved according to the invention in that the process for producing a formed article substantially consisting of tubular elements by placing these elements close together and connecting them with each other is characterized by placing together elements having, between them, different properties.

The tubular elements preferably consist of multiangular tubes, particularly of hexagonal tubes.

It may be an advantage to use conglomerates of tubes, because a higher rate of production can then be achieved.

In order to obtain formed articles with good properties it is an advantage to use tubular elements with an average diameter of between 1 and 10 mm. Preferably the diameter is between 3 and 6 mm.

The chosen wall thickness of the tubular elements is usually between 25 and 500 micrometers, preference is given to the use of elements having a wall thickness of between 50 and 200 micrometers.

The tubular elements are preferably interconnected by gluing or fusing (sealing).

A property in which the elements may differ from each other may advantageously be the chosen length. Every tube is cut to its desired length with its ends at their desired angles, and placed in its desired position. Thus a single or double-curved article can be had in one process step. In this connection it is also an advantage in the production of a double-curved article first to prepare a mould according to the process described above and subsequently the actual formed article.

Another property in which the elements may differ from each other may advantageously be the chosen wall thickness. In this manner reinforcements may be applied at previously appointed places, so that the use of fillers is no longer necessary. The use of tubular elements with previously formed screw threads is another possibility. Many other variations may be thought of.

The next property in which the tubular elements may differ from each other may be the chosen material. If specific properties are desired at specific places, for instance a very high dimensional stability at high temperatures, a more expensive synthetic material with the desired properties may be positioned at such place, a cheaper synthetic material being used elsewhere.

Many other properties can be thought of and the three mentioned above are definitely not meant to be limitative. Formed articles with tubular elements different from each other (except as far as differences in length are concerned) are novel.

The tubular elements may be of all sorts of materials such as, for instance, a metal like iron or aluminum, thermosetting plastics like phenolformaldehyde resin and melamineformaldehyde resin, unsaturated polyester resins, bismaleimide resins, preferably in combination with reinforcing fibres such as glass or carbon fibres, but thermoplastics, too, are highly suitable. Preference is given to thermoplastics, because the tubular elements can then be easily extruded and be cut to the desired length. Suitable thermoplastic polymers are particularly polyvinyl chloride, polycarbonates, polyamides (nylon 6,6, nylon 4,6, etc.) and polyimides on account of their relatively high temperature resistance and/or fire resistance.

One of the principal properties of formed honeycomb structures is the buckling load, that is the load at which the tubular elements are depressed in lengthwise direction.

The object of the invention is also to provide a formed article with a higher buckling load, the weight and material being the same.

This object of the invention is achieved in that the formed article substantially consisting of interconnected tubular elements is characterized in that cavities are present between the elements having, between them, different properties.

The process according to the invention relates to a process for producing a formed article substantially consisting of tubular elements by placing these elements close together and connecting them with each other and is characterized in that the tubular elements that have, between them, different properties are so placed that cavities are formed between the elements.

A honeycombstructure with cavities between the elements is described in U.S. Pat. No. 3,070,198. However in this patent the elements used to form the structure are not substantially tubular in shape. Spaced parallel strips or sheets are used, interconnected by rows of secondary cells. Neither is there any mentioning of the application of elements which have, between them, different properties.

The cavities are preferably provided at regular places. Thus, when using hexagonal tubes, every potential third tube to be placed may be left out. If the tubes are glued together, the great advantage is that each time only two surfaces, placed at an angle of 120°, need be glued. If the cavities were to be filled up, three surfaces would have to be glued. If, for instance, contact adhesive is used, the positioning of the tubes must be far more accurate.

Further, it is a great advantage that the rate of production is substantially higher.

BRIEF DESCRIPTION OF THE DRAWINGS

The invention can be elucidated with reference to FIGS. 1–3. In FIGS. 1a and 1b formed articles (1) and (2) respective, are represented. (1) is a formed article that can be used as a mould and (2) is a double-curved article showing the tubular elements (3) and the cavities (4). Owing to the formation of the cavities (4) by the tubular elements (3) and (3'), a saving on the weight is achieved of ⅓ (every potential third tube to be placed is left out). This means that the chosen, placed tubes may be 1 ½ times as thick to obtain the same weight. Tubular elements with thicker walls are easier to make, which is an advantage. The weight being the same, the compressive strength increases, because the compressive strength depends on the wall thickness to the third power. In FIGS. 2 and 3 the principle related to the tubular elements (3) and the cavities (4) is shown in more detail.

Conventional honeycombs made out of sheets also have single and double walls. The great disadvantage of these is that the shear strength and the modulus of shear are highly isotropic, because all double faces are in the same direction.

The formed articles are highly suitable for use in sandwich structures together with facings. The facings used are preferably fibre-reinforced plastics or aluminum.

The tubular elements are preferably placed by means that are controlled by an automatically controlled machine. Particularly a computer-controlled machine has been found to be an advantage, so that the machine can conveniently be controlled from a CAD facility (computer-aided design). The ordinary artisan will readily appreciate suitable automatically controlled machines for the purposes recited therein and as exemplified below. Therefore, a more detailed discussion of the same is not necessary herein.

The invention will be further elucidated with reference to the examples without being limited thereto.

EXAMPLE I

Figure 1A:
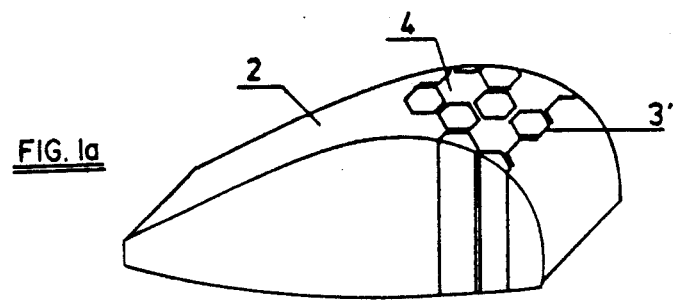
FIG. 1a is a schematic perspective view of a formed article provided in accordance with the present invention.
Figure 1B:
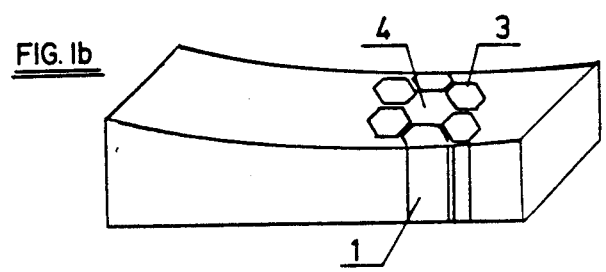
FIG. 1b is a schematic perspective view of another formed article provided in accordance with the present invention.
Figure 1C:
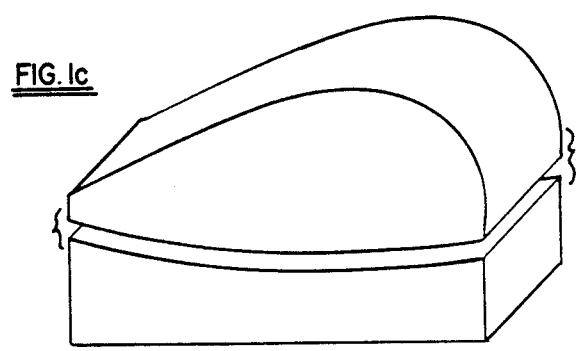
FIG. 1c is a schematic perspective view of a formed article in accordance with the Example 1 of the invention.

Of polyetherimide, hexagonal tubes having a length of 3–5 cm are cut from a long tube having an average diameter of 5 mm and a wall thickness of 100 micrometers. Before being fed to a pick & place robot, these tubes are provided always on two sides with an epoxy adhesive and built up by the robot at a rate of 3 tubes per second to form 1 $m^2$ of honeycomb in 2 hours and 50 minutes. The honeycomb has a structure represented in a simplified form in FIG. 1c. By cutting the tubes (3) at their desired angles and placing them in their correct positions a formed article (1) is obtained that can be used as a mould for a double-curved formed article (2) of polyetherimide. For producing the sandwich a facing is glued on the formed article (2).

EXAMPLE II

Figure 2:
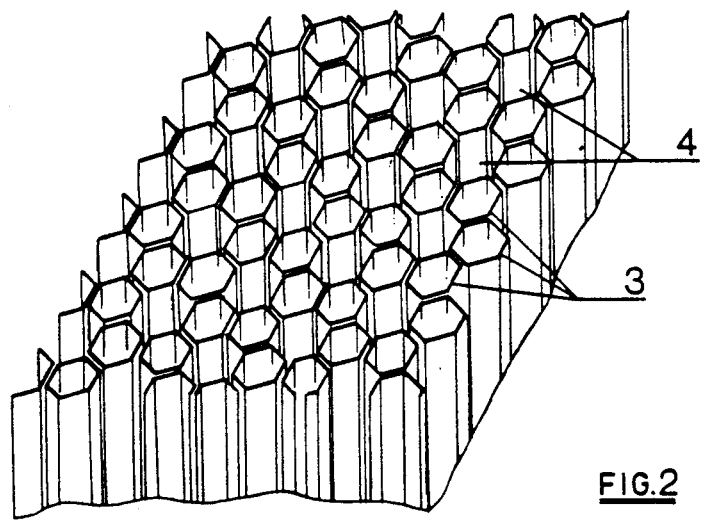
FIG. 2 is a schematic perspective view showing the relation of tubular elements and cavities in accordance with the invention.
Figure 3:
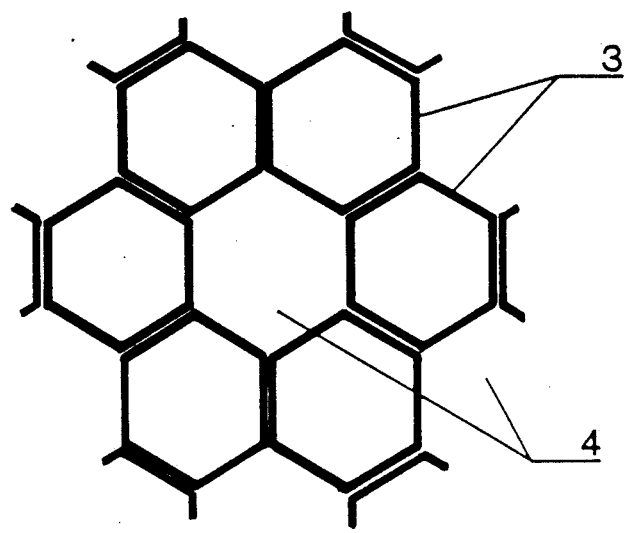
FIG. 3 is an enlarged top plan view of the tubular element and cavity relation shown in FIG. 2.

By analogy with example I, 1 $m^2$ of honeycomb with locally different properties is made in 2 hours and 50 minutes by feeding to a robot hexagonal tubes with a length of 5 cm and an outside diameter of 5 mm with different properties with respect to the type of material. The honeycomb has a structure represented in a simplified form in FIG. 2.

EXAMPLE III AND IV

By analogy with example I, 1 $m^2$ of honeycomb is made by always feeding to the pick & place robot a conglomerate of 2 tubes. These are respectively two tubes glued together and a decagonal tubular element that can be thought of as being built up of two hexagons placed against each other.

We claim:

1. A process for producing an article consisting substantially of tubular elements comprising:
   providing a plurality of tubular elements having a common hexagonal cross-sectional shape but different properties;
   connecting said tubular elements together so that longitudinal axes of said tubular elements extend in a common direction, said tubular elements being connected together so that cavities are defined between at least some of said connected tubular elements, each said cavity having a hexagonal cross-section.

2. A process according to claim 1, wherein said tubular elements are connected to each other so as to form conglomerates of tubular elements and said conglomerates of tubular elements are coupled together to form said formed article.

3. A process according to claim 1, wherein said step of connecting said tubular elements comprises gluing said tubular elements together.

4. A process according to claim 1, wherein said step of connecting said tubular elements comprises placing the tubular elements in a desired position with a robot.

5. A process according to claim 1, wherein said tubular elements differ in length.

6. A process according to claim 1, wherein said tubular elements differ in wall thickness.

7. A process according to claim 1, wherein said tubular elements differ in constituent material.

8. A process according to claim 1, wherein said cavities are defined at regular intervals between said tubular elements.

* * * * *